T. J. SPICER.
ANTISKIDDING DEVICE FOR AUTOMOBILES.
APPLICATION FILED MAR. 26, 1914.

1,120,633.

Patented Dec. 8, 1914.

Witnesses:
J. L. Sarbacher
M. Storm.

Inventor:
Thomas J. Spicer
By Chapin & Ferguson
Attorney.

UNITED STATES PATENT OFFICE.

THOMAS J. SPICER, OF BALTIMORE, MARYLAND, ASSIGNOR OF ONE-FOURTH TO JACOB B. ELLINGER, OF BALTIMORE, MARYLAND.

ANTISKIDDING DEVICE FOR AUTOMOBILES.

1,120,633.  Specification of Letters Patent.  Patented Dec. 8, 1914.

Application filed March 26, 1914. Serial No. 827,273.

*To all whom it may concern:*

Be it known that I, THOMAS J. SPICER, a citizen of the United States, residing at Baltimore, in the State of Maryland, have invented certain new and useful Improvements in Antiskidding Devices for Automobiles, of which the following is a specification.

This invention relates to improvements in anti-skidding devices for automobiles, and has for its object to provide a simple, cheap and efficient device that can be readily attached to the wheels of an automobile, or other motor vehicle, to prevent skidding thereof.

The invention consists of the novel construction and arrangement of the parts and combination of parts hereinafter more fully set forth in the following specification and pointed out in detail in the appended claims.

Figure 1:
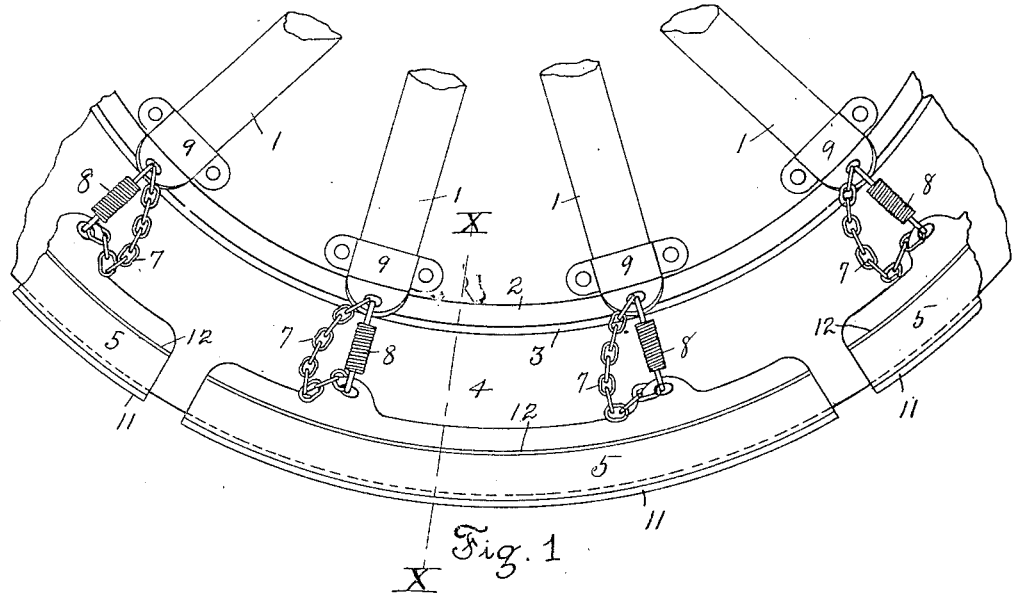
Figure 2:
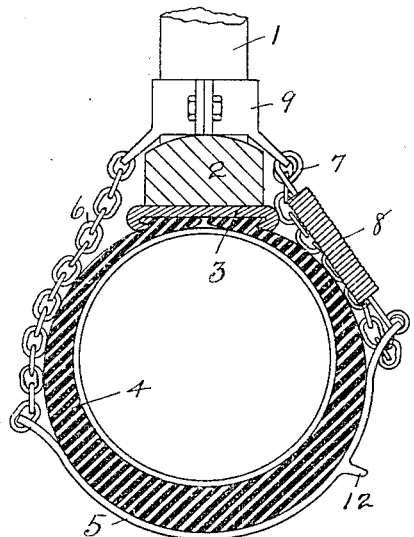

In the accompanying drawings, Figure 1 is a side elevation of a portion of a wheel, looking at the inside thereof, and showing my invention applied thereto. Fig. 2 is an enlarged sectional view taken on the line x—x of Fig. 1.

Referring to the accompanying drawings, forming part of this specification, and in which like reference numerals designate like parts throughout the several views thereof, 1 designates the spokes of the wheel, 2 the felly, 3 the metal rim surrounding the felly, and 4 the rubber tire.

My invention consists of a number of metal sections 5 which are held in position on the tire 4 by a chain 6 on the outside of the wheel, and the chains 7 and springs 8 on the inside of the wheel.

The device is used on the two rear wheels of the vehicle. The chains 6 are connected at one end to the outside of the sections 5 and have their other ends connected to the clamps 9 on the spokes 1. The chains 6 are normally taut. The inside edge of the sections 5 are connected by chains 7 to the opposite sides of the clamps 9, said chains 7 being normally slack, and by the coiled springs 8 which hold the said sections 5 to their normal position on the tire. The sections 5 are each provided with a flange, or rib, 11 directly under the center of the tire and another flange or rib 12 between the first-named flange and the inner edge of the sections. These flanges 11 and 12 may be of any suitable size.

The operation of the device is as follows: The wheel is normally running on the flange, or rib, 11, and should the machine start to skid to either side the section 5 directly under the tire at the time would be drawn by the sidewise movement of the wheel around against the tension of the springs 8 and cause the flange 12 to strike the ground and stop the said sidewise movement, or skidding, of the machine, the chains 7 being drawn taut and holding the said section in position. As soon as the wheel passes over the section 5 directly thereunder the coiled springs 8 will return it to its normal position.

Having thus described my invention, what I claim is:

1. An anti-skidding device comprising a plate secured to the wheel tire and having an uneven surface directly under the center of said tire and a projection between the said uneven surface and the inner edge of the plate, and springs to hold said plate to its normal position.

2. An anti-skidding device comprising a plate having its outer edge connected by chains to the spokes and its inner edge connected by chains and coiled springs to said spokes, said plate having a projection on its outer surface.

3. The combination with the wheels, of an anti-skidding device comprising a number of plates each having a projection in line with the center of the wheel tire, and a projection between the first-named projection and the inner edge of the said plate, chains connecting the outer edge of said plates with the spokes of the wheel, chains connecting the inner edge of the plates with the spokes of the wheel, and coiled springs connected to the inner edge of the plates and to the spokes and adapted to hold the said plates in their normal position.

In testimony whereof I affix my signature in presence of two witnesses.

THOMAS J. SPICER.

Witnesses:
 CHAPIN A. FERGUSON,
 CHARLES E. GARITEE.

*Copies of this patent may be obtained for five cents each, by addressing the "Commissioner of Patents, Washington, D. C."*